(No Model.)
M. H. MASON.
SUPPORT FOR BICYCLES.
No. 593,361.  Patented Nov. 9, 1897.
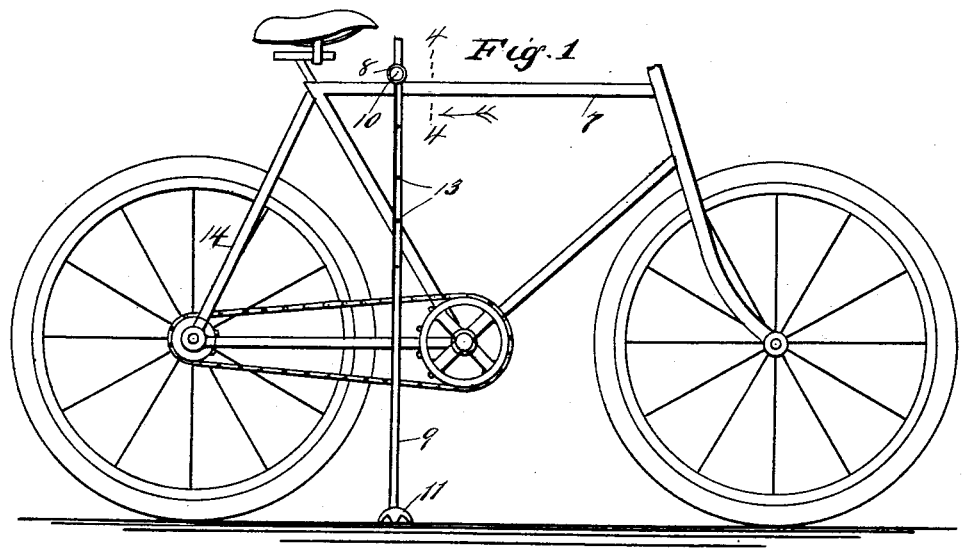
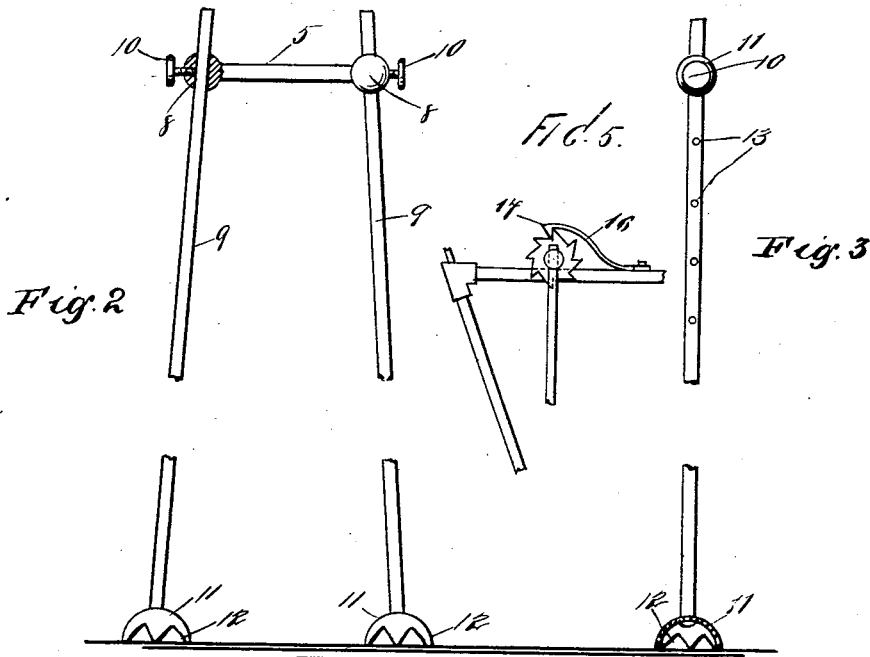
WITNESSES
INVENTOR
Martha H. Mason
BY
Edgar Tate & Co.
ATTORNEYS.

UNITED STATES PATENT OFFICE.

MARTHA HUBBARD MASON, OF SAN DIEGO, CALIFORNIA.

SUPPORT FOR BICYCLES.

SPECIFICATION forming part of Letters Patent No. 593,361, dated November 9, 1897.

Application filed March 8, 1897. Serial No. 626,483. (No model.)

*To all whom it may concern:*

Be it known that I, MARTHA HUBBARD MASON, a citizen of the United States, residing at San Diego, in the county of San Diego and State of California, have invented certain new and useful Improvements in Supports for Bicycles, of which the following is a full and complete specification, such as will enable those skilled in the art to which it appertains to make and use the same.

This invention relates to supports for bicycles; and the object thereof is to provide an improved device for this purpose which may be connected with or suspended from the frame of the vehicle and which will serve as a support therefor when the vehicle is not in motion and which may be employed to prevent the vehicle from falling when used by beginners.

In the drawings forming part of this specification the separate parts of my improvement are designated by the same numerals of reference in each of the views.

In said drawings, Figure 1 is a side view of a bicycle provided with my improvement, the handle-bar being broken away; Fig. 2, a sectional front view of the support detached; Fig. 3, a side view thereof; Fig. 4, a section on the line 4 4 of Fig. 1; and Fig. 5, a side view of a modification, part of which is also shown in Fig. 4.

In the drawings forming part of this specification I have shown in Fig. 1 a bicycle provided with what is known as a "diamond frame," and in the practice of my invention I provide a support which consists of a cross rod or bar 5, which is passed through a keeper 6, secured to the upper horizontal rod 7 of the frame of the vehicle, and the rod or bar 5 is preferably connected with the rod 7 of the frame just forwardly of the seat.

The rod or bar 5 of the support is preferably provided at each end with enlarged hubs or heads 8, and passing through these hubs or heads 8 at each end of the rod or bar 5 is a rod 9. The rods 9 are vertically adjustable in the hubs or heads 8 by means of set-screws 10, and each of said rods 9 is provided at its lower end with a cup-shaped foot 11, and these cup-shaped feet are convexo-concave, the convex surfaces being directed upwardly and the lower edges thereof are provided with teeth or projections 12. These feet 11, however, may be of any desired form, and in practice I also preferably form in the outer sides of the rods 9 small cavities or recesses 13, into which the set-screws 10 are adapted to enter.

My invention, however, is not limited to the means herein shown and described for connecting the rods 9 with the hubs or heads 8, and any suitable devices by means of which the rods 9 will be adjustable in said hubs or heads may be employed. When constructed in this manner and connected with the bicycle-frame as described, my improved support will hang or be suspended from the rod 7 of the frame of the vehicle and the lower ends of the rods 9 may swing forwardly and backwardly, as will be readily understood, and when it is desired to support the vehicle in an upright position the rods 9 are so adjusted that the feet 11 thereof will rest on the ground, as shown in Fig. 1, and said rods 9 may be adjusted so that the devices may be used by a beginner in learning to ride a bicycle, the rods 9 being so adjusted in this case that the feet 11 will be held at a short distance from the ground, and if the vehicle should attempt to fall to either side one of said feet will catch and support it long enough to enable the rider to regain an equilibrium.

The rear fork or rods 14 of the frame of the vehicle may be provided with suitable hooks or other devices for holding the rods 9 of the support when the latter are not in use, and it will be apparent that my improved support may be suspended from other parts of the frame, and may also be used in connection with a lady's bicycle, if desired. I prefer, however, to provide devices for holding the support in the desired position, such as are shown in Figs. 4 and 5, and these devices consist of one or more ratchet-wheels 15, which are secured to or mounted on the cross-bar 5, and in connection with said ratchet-wheels I employ a spring-pawl 16, which is secured to the upper horizontal rod 7 of the frame of the vehicle, and this pawl 16 is provided with a cross-head 17, which operates in connection with both of said ratchet-wheels, and by means thereof the support may be held in the position shown in Fig. 1, or so as to prevent the lower ends of the legs 9 from swinging backwardly, and by raising the spring-pawl 16 the legs of the support may be swung backwardly and held in any desired position.

The ratchet-wheels 15 are rigidly secured to the cross-bars 5, and the legs 9 of the support may be held by means of said ratchet-wheels and said spring-pawl at any desired backward inclination.

Having fully described my invention, I claim as new and desire to secure by Letters Patent—

The herein-described support for bicycles comprising a bar mounted transversely of the horizontal tube of the frame, a vertical tube adjustably mounted at each end of the said bar, said vertical tubes being each provided at the lower end thereof with cup-shaped feet, a ratchet-wheel mounted on said transverse bar, a spring provided with a ratchet-tooth mounted on said horizontal bar of the frame and adapted to engage said ratchet-wheel, substantially as and for the purpose described.

In testimony that I claim the foregoing as my invention I have signed my name, in presence of the subscribing witnesses, this 23d day of February, 1897.

MARTHA HUBBARD MASON.

Witnesses:
WM. H. MASON,
AMELIA R. HUBBARD.